US006703055B1

(12) United States Patent
Klein et al.

(10) Patent No.: US 6,703,055 B1
(45) Date of Patent: Mar. 9, 2004

(54) WINE FERMENTATION CAP MANAGEMENT AND POMACE REMOVAL

(75) Inventors: Daniel Klein, 8339 Holy Cross Pl., Los Angeles, CA (US) 90045; Anthony Robert Matthews, Atascadero, CA (US); Walden A. Davis, Shandon, CA (US); Ronnie E. Barton, Paso Robles, CA (US)

(73) Assignee: Daniel Klein, Stevenson Ranch, CA (US)

( * ) Notice: Subject to any disclaimer, the term of this patent is extended or adjusted under 35 U.S.C. 154(b) by 344 days.

(21) Appl. No.: 09/834,201

(22) Filed: Apr. 12, 2001

Related U.S. Application Data

(62) Division of application No. 09/387,906, filed on Sep. 1, 1999, now abandoned.

(51) Int. Cl.⁷ .............................. C12H 1/00; C12G 1/02
(52) U.S. Cl. .................... 426/11; 426/489; 426/484; 426/473; 426/519; 435/291.1
(58) Field of Search .............................. 435/93, 291.1; 426/15, 11, 489, 484, 473

(56) References Cited

U.S. PATENT DOCUMENTS

| | | | |
|---|---|---|---|
| 3,604,690 A | 9/1971 | Traelnes | 259/107 |
| 3,713,839 A | 1/1973 | Delente et al. | 99/31 |
| 3,910,173 A * | 10/1975 | Zepponi | 99/277.1 |
| 4,110,089 A | 8/1978 | Muller | 55/178 |
| 4,164,902 A * | 8/1979 | Maarleveld | 99/277.1 |
| 4,201,792 A * | 5/1980 | Fricker et al. | 426/15 |
| 4,256,839 A | 3/1981 | Solomons et al. | 435/314 |
| 4,474,890 A * | 10/1984 | Rieger | 435/298.1 |
| 4,494,878 A | 1/1985 | Rainey, Jr. | 366/341 |
| 4,610,701 A | 9/1986 | Hoffman | 55/87 |
| 4,747,696 A | 5/1988 | McCrory et al. | 366/307 |
| 4,799,862 A | 1/1989 | Davidson et al. | 416/242 |
| 4,934,828 A | 6/1990 | Janssen | 366/307 |
| 5,188,808 A | 2/1993 | Lilja et al. | 422/229 |
| 5,312,567 A | 5/1994 | Kozma et al. | 261/87 |
| 5,431,860 A | 7/1995 | Kozma et al. | 261/93 |
| 5,472,278 A | 12/1995 | Kawaoka et al. | 366/262 |
| 5,800,058 A | 9/1998 | Cook | 366/306 |
| 6,203,826 B1 * | 3/2001 | Calvin | 426/15 |

FOREIGN PATENT DOCUMENTS

| | | | |
|---|---|---|---|
| EP | 0246202 | * | 11/1987 |
| WO | WO 97/44437 | * | 11/1997 |

* cited by examiner

Primary Examiner—N. Bhat
(74) Attorney, Agent, or Firm—Head, Johnson & Kachigian

(57) ABSTRACT

A wine fermentation device for fermenting wine, and skins, seeds and stems which form a cap. The device includes a tank having cylindrical walls, an axis and a bottom. One or more optional interior baffles may be provided. At least one drain is located at or near the tank bottom. The device includes at least one impeller, and in a preferred embodiment two impellers, each impeller having a plurality of blades to radially and axially move the cap during fermentation and to blend the cap with liquid to permit draining of the cap (or pomace) through the drain.

11 Claims, 4 Drawing Sheets

WINE FERMENTATION CAP MANAGEMENT AND POMACE REMOVAL

This is a divisional application of Ser. No. 09/387,906 filed on Sep. 1, 1999 now abandoned.

BACKGROUND OF THE INVENTION

1. Field of the Invention

The present invention is directed to a fermentation system involving extraction of components from solid particles into a liquid. In particular, the present invention relates to a wine fermentation device for periodically turning the cap or skins, seeds and stems which during fermentation form the cap, and for removing the skins, seeds, part of the pulp and stems which form the pomace from the tank after fermentation has been completed.

2. Prior Art

In the process of wine making, grapes are converted into wine in a fermentation vat or tank. The various processes may be varied somewhat both in the particular steps, the quantities involved, and in the durations. Wine may be fermented in small quantities of a few gallons at home up to large quantities in tanks holding thousands of gallons. Modern wineries use stainless steel tanks that can hold up to 150,000 gallons. The tanks may be jacketed to control the liquid temperature. This is accomplished in a number of known ways, such as circulating a liquid, such as glycol, through the jackets.

In a typical process, the grapes are picked in clusters and initially cleaned of foreign matter. The stems may or may not be removed but oftentimes at least part of the stems are left on. The grapes are crushed and the "must" or entire unfermented crushed grape mass sometimes including the stems is put in the fermentation vat. The must is inoculated with yeast to begin fermentation. The evolution of the carbon dioxide causes the skins to rise to the surface of the wine and form a dense cap. Ordinarily, the seeds and stems sink to the bottom of the tank but some are lifted with the buoyant skins. The skin of the grapes, some of the seeds, and some stems form a cap which is buoyant and typically will float to the surface of the wine (or at that time, juice or fermenting must) mixture after inoculation.

The grape skins, seeds and stems is called a cap during the fermentation process. The mass of grape skins, seeds and stems left after fermentation is complete is called pomace.

A number of factors will be measured and adjusted during the wine making process. The sugar content is measured as the alcohol will be dependent thereon. Titratable acidity is the measure of the total acid in the grape juice. The pH will also be measured.

Thereafter, yeast is added to the mixture or must. Once the fermentation begins, the cap must be periodically mixed with the liquid mixture, punched down or pumped over. Extraction of the requisite amount of red color from the skins will not be obtained unless there is contact between fluid and the cap. For example, it may be desirable to punch the cap down twice a day. In smaller batches, this can be done by hand. In larger tanks, a rake or other instrument is used for punching down. A pump is used in a pump over to draw off fermenting fluid below the cap and distributed over the cap.

After fermentation, the wine is drained and stored in containers and the solids (or pomace) which consists of skins, seeds, part of the pulp and, perhaps, stems must be removed. In the past, it was necessary for personnel to enter the tank and rake or shovel the pomace out.

Accordingly, there remains a need for a fermentation vat that will be capable of periodically rolling, submerging or wetting the cap as desired to assist in the fermentation and making of the wine.

There is also a need for a fermentation system to remove pomace from the fermentation vat without human intervention.

There is a further need to provide a fermentation system to control and optimize the color, tannin and bitterness extraction during the wine making process.

There is an additional need to provide a fermentation system which will enhance repeatable wine processing and repeatable validation.

SUMMARY OF THE INVENTION

The present invention is directed to a wine fermentation device and a process to ferment wine.

The device includes a tank having cylindrical walls, an axis therefore, and a bottom. An optional top on the tank forms a closed vessel. Must or grape juice, crushed grapes, skins, seeds and stems are loaded into the tank at the beginning of the wine fermenting process.

The tank includes a plurality of interior baffles which extend from the cylindrical tank walls inward toward the axis.

A pair of impellers are provided within the tank. Each impeller has a plurality of extending blades which serve to radially and axially move the cap in the tank during fermentation. The impellers also serve to blend the cap with liquid in order to permit draining of the cap through a drain which is provided in the cylindrical walls at or near the tank bottom. The first impeller is axially spaced from the second impeller which is located near the bottom of the tank.

In a present, preferred embodiment, each impeller has three radially extending blades. Each blade has approximately 45° pitch or varying pitch. The pitch on the blades forces the liquid to move radially and also to move axially as well. The impellers are each connected to a shaft. The shaft is axially aligned with the axis of the tank. The shaft extends through the top and/or bottom of the tank and is connected to a motor. The motor 20 will rotate the shaft and, accordingly, drive the impellers.

The tank bottom is sloped toward the drain or drains located near the base of the bottom. Accordingly, draining of the tank is facilitated. The cap, consisting of the skins, some of the seeds and some of the stems is buoyant with respect to the juice or wine and will float to the top. Rotating of the impellers will cause the juice or wine and the cap to rotate radially and also to move axially. The cap will be mixed with the underlying juice or wine. This process is known as turning the cap.

The cap, as well as the juice or wine flow, will be directed by the baffle or baffles further encouraging axial movement.

Once the fermentation process has been completed in the fermentation device, the majority of the wine will be drained from the tank. Since the drain is near the bottom of the tank, none of the cap is drained or removed at this point. Once the majority of the wine has been removed, the remaining cap and remaining wine is blended and agitated to create a slurry.

Thereafter, the slurry is drained off through the drain near the bottom. With use of the present invention, it would not be necessary for personnel to enter the tank to clean the pomace out once the fermentation process has been performed.

DETAILED DESCRIPTION OF THE PREFERRED EMBODIMENTS

Figure 1:
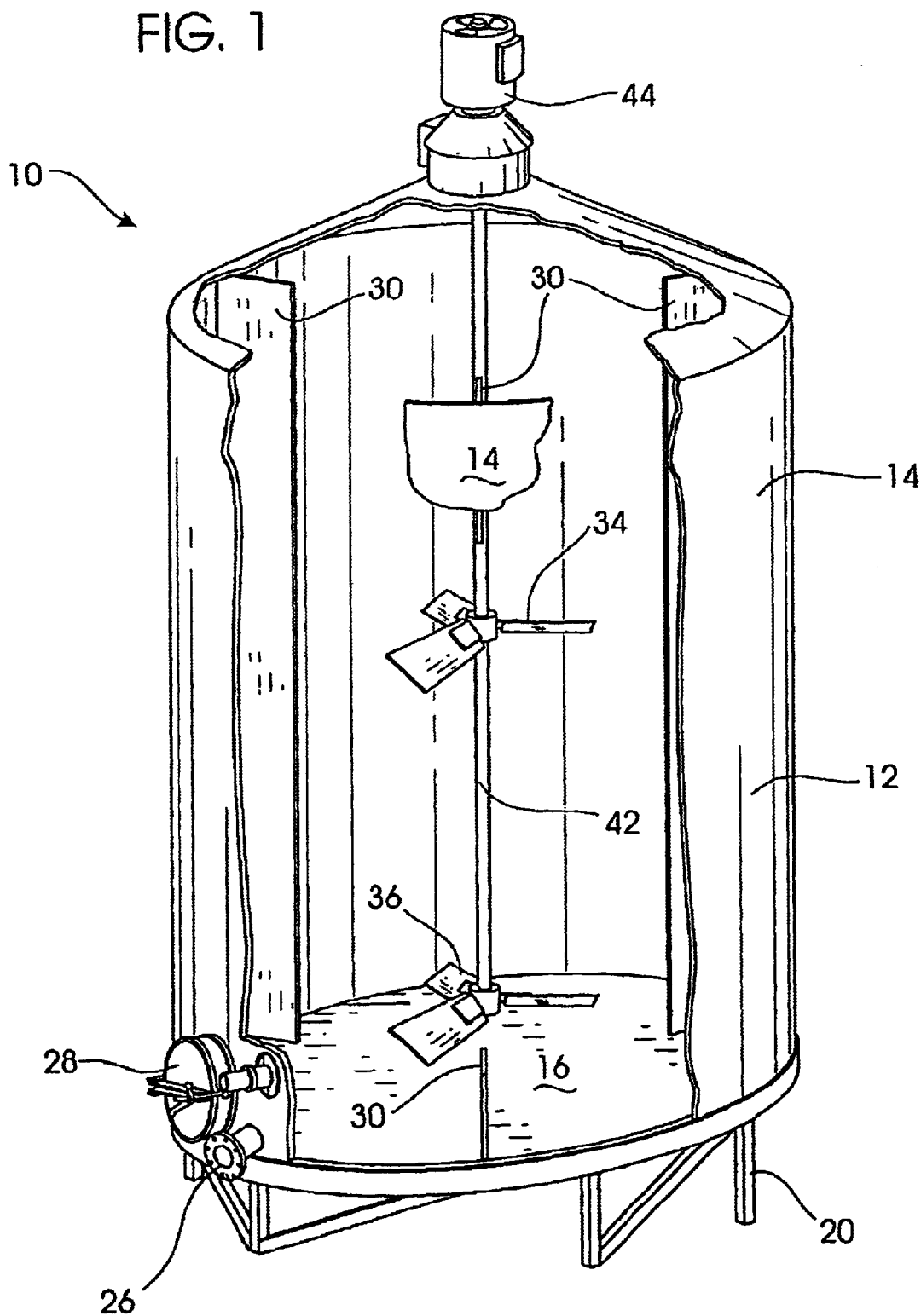
FIG. 1 is a perspective view of a wine fermentation device constructed in accordance with the present invention with portions cut away for clarity.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Like numbers in the drawings indicate like parts in various embodiments of the invention.

Referring to the drawings in detail, FIG. 1 illustrates a perspective view of a wine fermentation device 10 which has been partially cut away for clarity.

The device 10 includes a tank 12 having cylindrical walls 14, an axis therefore, and a bottom 16. In the present embodiment, the tank 12 also includes a top 18 in order to form a closed vessel. While the tank 12 in the present embodiment is made from stainless steel, other materials might be utilized such as concrete. Various other structures, such as a substructure 20 beneath the bottom, may be utilized as desired.

The tank 12 is utilized in the wine making process. The must or grape juice, crushed grapes, skins, seeds and stems are loaded into the tank 12 at the beginning of the wine fermenting process. The floating skins, seeds and stems are collectively referred to as the cap.

At least one drain 26 is provided in the cylindrical walls 14 at or near the tank bottom 16. Until the present invention, a man way 28 was required to be used as an entry door for personnel to enter the tank to remove the pomace. One or more of the drains may include a valve (not shown) in order to drain off the wine or the pomace slurry as desired.

The tank 12 also includes a plurality of interior baffles 30 which extend from the cylindrical tank walls inward toward the axis of the tank. In the present embodiment, it has been found preferable to have three equidistant spaced interior baffles 30. It would also be possible to have baffles which do not extend toward the tank axis. It will be appreciated that a greater or lesser number of baffles may be included within the scope of the invention.

Figure 3:
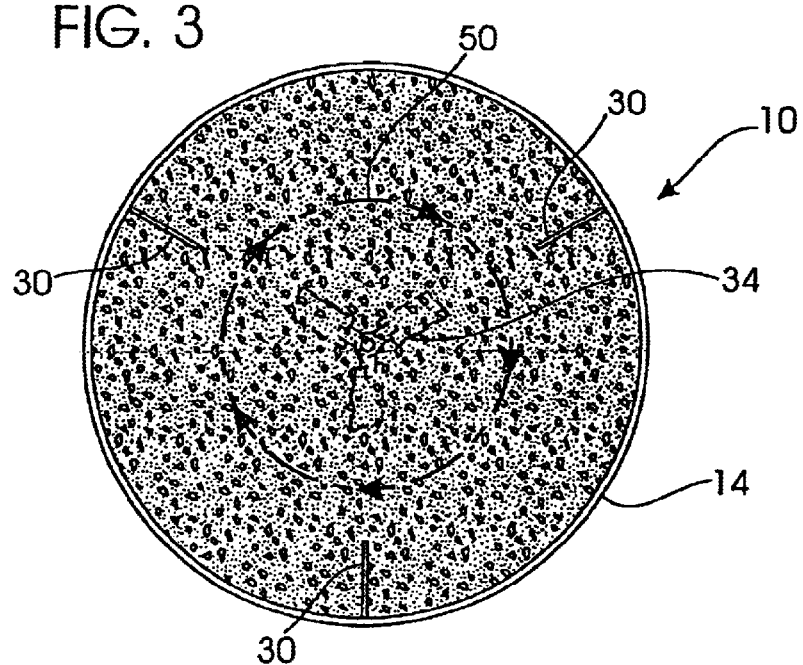
FIG. 3 is a sectional view of a wine fermentation device shown in FIG. 1.
Figure 2:
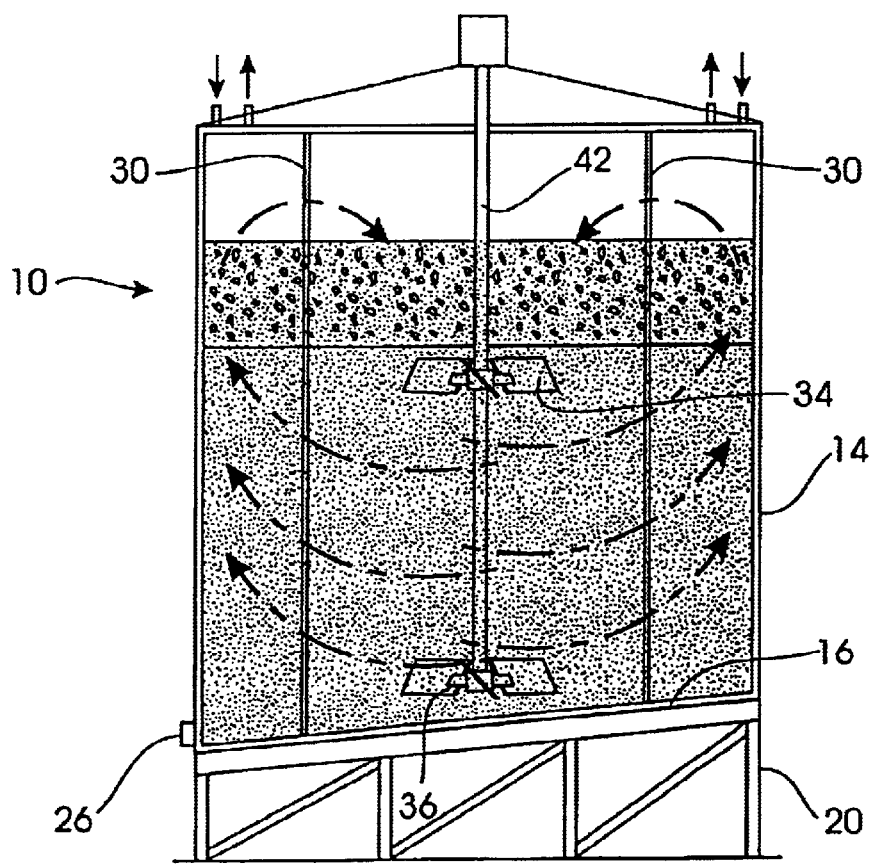
FIG. 2 is a sectional view of a wine feementation device as shown in FIG. 1.

With continuing reference to FIG. 1, and additional reference to FIGS. 2 and 3, a pair of impellers 34 and 36 are provided on the interior of the tank. Each impeller has a plurality of blades 38 and 40 which serve to radially and axially move the cap in the tank during fermentation. The impellers 34 and 36 also serve to blend the cap with liquid in order to permit draining of the cap through the drain. The first impeller 34 is axially spaced from the second impeller 36 which is located near but spaced from the bottom of the tank. In the present, preferred embodiment, each impeller has three extending blades. This has been found to be preferable where three baffles have been utilized. Each blade 38 and 40 has approximately a 45° pitch. The pitch on the blades forces the liquid to move radially and to move the liquid axially as well. The impellers 34 and 36 are each connected to a shaft. The shaft is axially aligned with the axis of the tank. The shaft 42 extends through the top 18 and is connected to a motor 44. The motor 44 will rotate the shaft and, accordingly, drive the impellers.

Within the scope of the invention, the shaft 42 may be connected to the motor 44 via gear box, may be directly coupled, or may be connected via a belt and sheave assembly.

As best seen in FIG. 2, the tank bottom 16 is not perpendicular to the axis of the tank, but is sloped. The drain or drains are located near the base of the bottom. Accordingly, draining of the tank 12 is facilitated.

Figure 5:
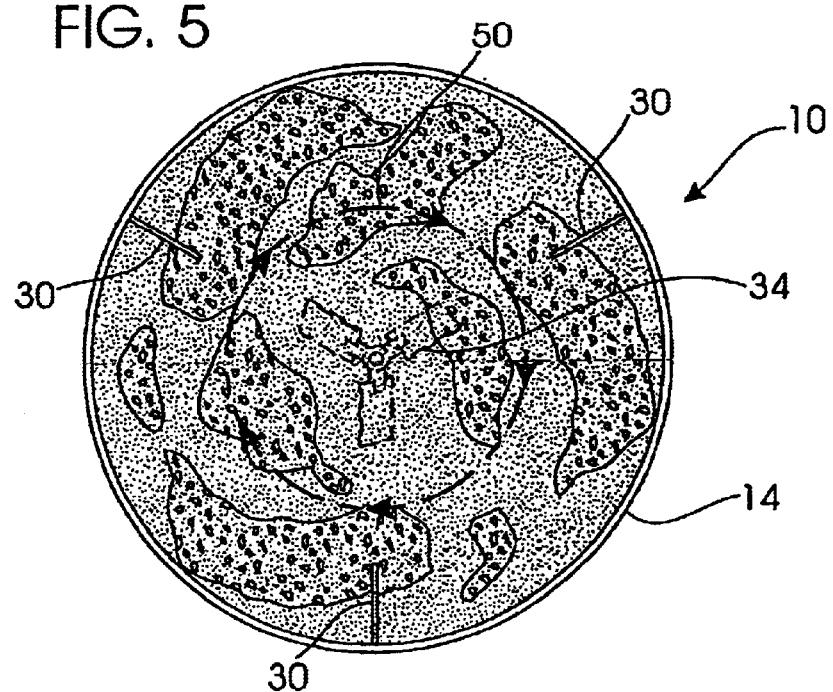
FIG. 5 is a top sectional view of a wine fermentation device as shown in FIG. 1 illustrating the consequences of the impeller movement on the cap as it mixes with the juice or must during the wine fermentation process.
Figure 4:
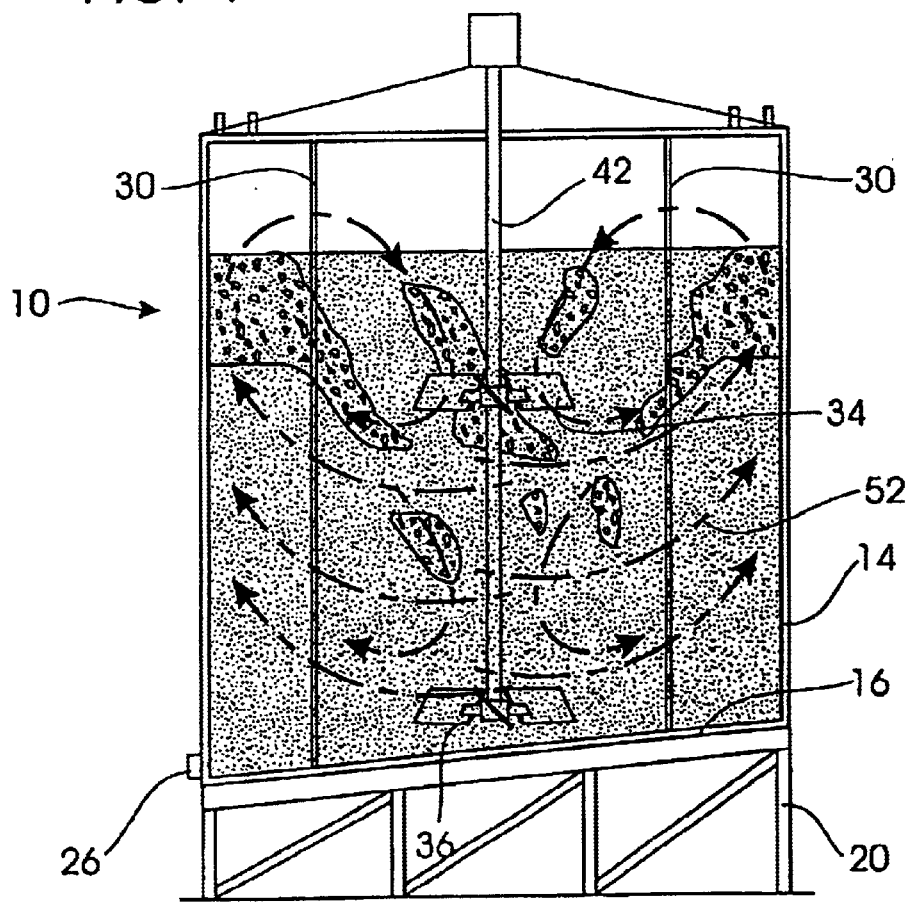
FIG. 4 is a side sectional view of a wine fermentation device as shown in FIG. 1 illustrating the sequence of the present invention utilized to manage the cap and remove pomace during the wine fermentation process as illustrated in the present invention.

The process to ferment wine is illustrated in FIGS. 2, 3, 4, 5, 6, and 7. As best seen in FIGS. 2 and 3, the cap, which consists of the skins, some of the seeds, and some of the stems, is buoyant with respect to the juice or wine and will float to the top. Rotating of the impellers will cause the juice or wine and the cap to rotate radially as shown by arrows 50 in FIG. 2. The juice or must and the cap will also move axially as shown by arrows 52 in FIG. 2. FIGS. 4 and 5 show the consequences of the impeller movement. The cap will be mixed with the underlying juice or wine.

The cap, as well as the juice or wine flow, will also be directed by the baffle or baffles 30 further encouraging axial movement. The cap will be periodically turned in this fashion over a number of days in order to transfer color and tannin from the floating skins to the wine. The process of cap management controls the amount of intimate contact between the skins and the fermenting wine.

In the present invention, the management of the cap can be standardized as opposed to the traditional method of turning the cap by hand and/or pumping the wine over the cap. Both of the impellers 34 and 36 assist in this function.

During fermentation, yeast and sugar may be added to the wine in chosen amounts during the fermentation.

Figure 6:
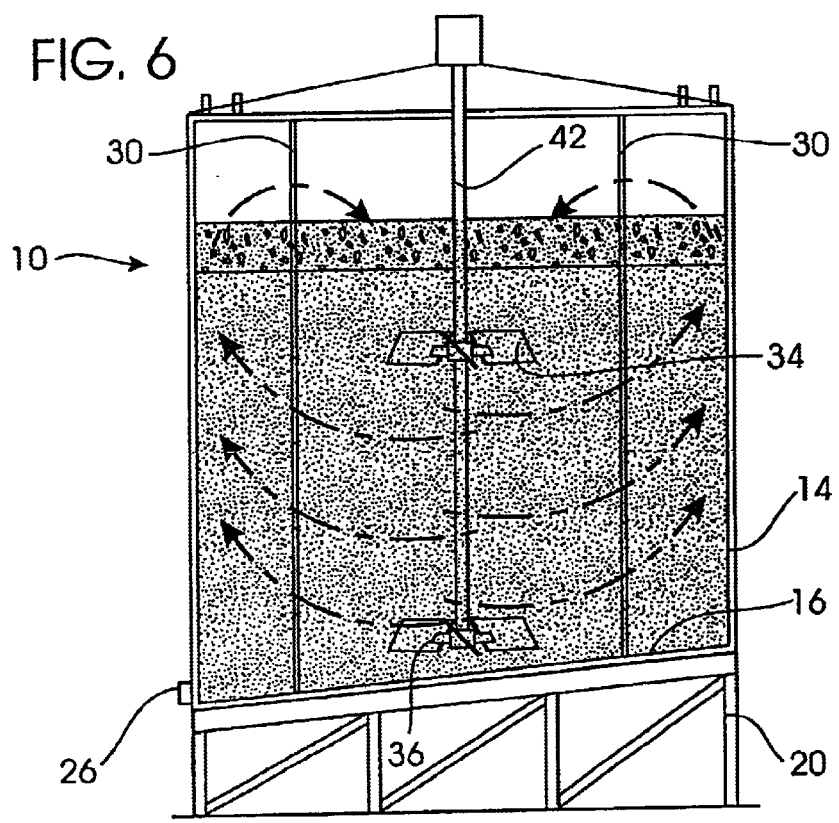
FIG. 6 is a side sectional view of a wine fermentation device as shown in FIG. 1 illustrating the cap and the juices or must before draining the wine after the fermentation process.
Figure 7:
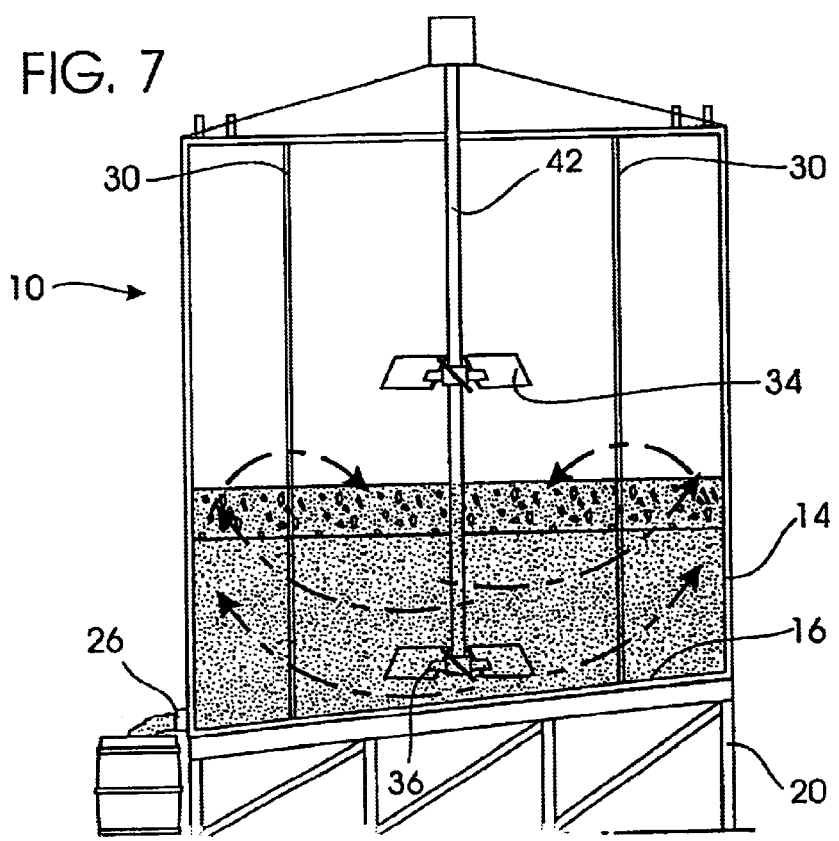
FIG. 7 is a side sectional view of a wine fermentation device as shown in FIG. 1 illustrating the process of creating a slurry after the majority of the wine is drained after the wine fermentation process.

FIGS. 6 and 7 illustrate the pomace removal process for the wines and skins, seeds and stems form a cap. Once the fermentation process has been completed in the fermentation device 10, the majority of the wine is drained from the tank 12. Since the drain 26 is near the bottom of the tank, none of the cap is drained at this point. Once the majority of the wine has been removed, as shown in FIG. 7, the remaining cap and remaining wine is blended and agitated to create a pomace slurry. Thereafter, the pomace slurry is drained off through the drain 26 near the bottom. The bottom impeller 36 performs this function. Through use of the present invention, it is not necessary for personnel to enter the tank to rake and clean the pomace out once the fermentation process has been performed.

Returning to a consideration of FIGS. 2, 4, 6 and 7, the temperature of the liquid in the tank will be influenced and controlled by an optional temperature control jacket on the tank cylindrical walls 14. The control jacket may be operated in a number of ways. In one embodiment, glycol or other liquid is pumped in through a series of tubes, channels or dimples producing heat transfer through the walls of the tank and, accordingly, into the liquid in the tank. The glycol is subsequently returned from the tubes, channels, or dimples and thereafter recirculated after heating or cooling.

Each tank may also be provided with insulation (not shown) to further control the temperature of liquid in the tank.

Whereas, the present invention has been described in relation to the drawings attached hereto, it should be understood that other and further modifications, apart from those shown or suggested herein, may be made within the spirit and scope of this invention.

What is claimed is:

1. A process for wine cap management for fermenting grape juice and skins, seeds and stems which forms a cap, which process comprises:

positioning a tank having cylindrical walls, an axis, and a bottom so that said cap will float parallel and opposed to said bottom;

filling said tank with said grape juice and said skins, seeds, and stems so that said cap will float above an impeller;

fermenting said grape juice and said cap in said tank to produce wine having cylindrical walls, an axis, and a bottom;

moving said wine radially and axially by periodically rotating said impeller having an axial shaft within said cylindrical tank, wherein said axial shaft is perpendicular to said floating cap;

moving said cap radially and axially by fluid force generated by movement of said wine wherein said wine movement is generated by said rotating impeller; and assisting axial flow of said wine with at least one baffle extending from said cylindrical walls toward said axis.

2. A process for wine cap management as set forth in claim 1 which includes the additional steps of adding yeast and sugar to said fermenting wine or must to promote fermentation.

3. A process of wine cap management as set forth in claim 1 which includes the additional step of controlling the temperature of said wine in said tank through a temperature jacket.

4. A process of wine cap management as set forth in claim 1 wherein said impeller shaft is driven by a motor.

5. A process of wine cap management as set forth in claim 1 including two said impellers extending horizontally from said axial shaft.

6. A wine pomace removal process for wine and skins, seeds and stems forming a cap fermented in a tank having cylindrical walls, an axis, and a bottom, wherein said cap floats parallel and opposed to said bottom, which process comprises:

draining a majority of said wine from said tank through a drain at said bottom so that a minority of said wine and said cap remain;

agitating and blending said cap with liquid wine remaining within said tank to create a pomace slurry; and draining off said pomace slurry through a drain at or near said bottom of said tank.

7. A wine pomace removal process as set forth in claim 6 wherein said drain includes a valve.

8. A wine pomace removal process as set forth in claim 6 wherein said agitating and blending step is accomplished through an impeller having a plurality of blades which are rotated by an axial shaft driven by a motor.

9. A wine pomace removal process as set forth in claim 8 including two said impellers, one located near said tank bottom to agitate and blend said cap.

10. A wine pomace removal process as set forth in claim 6 wherein said bottom of said tank is substantially planar and is sloped in angular relationship with respect to said axis of said tank.

11. A process of wine cap management as set forth in claim 1 wherein said bottom is substantially planar and arranged in angular relationship to said axis.

* * * * *